UNITED STATES PATENT OFFICE.

MORRIS THOMAS, OF SHARON, PENNSYLVANIA.

COMPOSITION OF MATTER FOR FILTERING OR CLEANING PETROLEUM, &c.

SPECIFICATION forming part of Letters Patent No. 680,290, dated August 13, 1901.

Application filed March 19, 1901. Serial No. 51,930. (No specimens.)

*To all whom it may concern:*

Be it known that I, MORRIS THOMAS, a resident of Sharon, in the county of Mercer and State of Pennsylvania, have invented a new and useful Composition of Matter to be Used in Filtering or Cleaning Petroleum and other Oils, of which the following is a specification.

My composition consists in the following ingredients, combined in the proportion stated: sawdust, ninety-nine per cent.; salt, one per cent. These ingredients are to be thoroughly mingled.

The function of the salt in said composition is to gather the dirt and foreign substances in the oil and retain them at the top of the mixture.

In using the above-named composition any filter in common use or any vessel having water-tight sides and perforated bottom may be filled with the composition. The petroleum or other oil is then deposited in the vessel and permitted to filter or percolate through the composition.

By the use of the above composition the impurities or foreign substances in the petroleum or other oil are speedily and thoroughly separated from the oil and retained in the composition, while the oil passes through into the receiving vessel a pure lubricant.

What I claim, and desire to secure by Letters Patent of the United States, is—

1. The herein-described composition of matter, consisting of sawdust and salt substantially as described and for the purpose specified.

2. The herein-described composition of matter for filtering or cleaning petroleum and other oils consisting of sawdust ninety-nine per cent., and salt one per cent. substantially as described.

In witness whereof I have signed my name to this specification in the presence of two subscribing witnesses.

MORRIS THOMAS.

Witnesses:
 H. G. McKAY,
 J. H. ELLIOTT.